(12) United States Patent
Mohandas et al.

(10) Patent No.: US 8,510,829 B2
(45) Date of Patent: Aug. 13, 2013

(54) SYSTEMS AND METHODS TO DETECT MALICIOUS MEDIA FILES

(75) Inventors: Rahul Mohandas, Kerala (IN); Vinoo Thomas, Chennai (IN); Plasamudram Ramagopal Prashanth, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 441 days.

(21) Appl. No.: 12/822,856

(22) Filed: Jun. 24, 2010

(65) Prior Publication Data

US 2011/0321160 A1 Dec. 29, 2011

(51) Int. Cl.
*G06F 11/00* (2006.01)
(52) U.S. Cl.
USPC ............................................. 726/22; 709/238
(58) Field of Classification Search
USPC .......................................... 726/22; 709/238
See application file for complete search history.

(56) References Cited

U.S. PATENT DOCUMENTS

| | | | |
|---|---|---|---|
| 5,983,348 A | 11/1999 | Ji | |
| 6,272,641 B1 | 8/2001 | Ji | |
| 6,804,780 B1 | 10/2004 | Touboul | |
| 7,058,822 B2 | 6/2006 | Edery et al. | |
| 7,610,375 B2 | 10/2009 | Portolani et al. | |
| 7,613,926 B2 | 11/2009 | Edery et al. | |
| 7,624,436 B2 | 11/2009 | Balakrishnan et al. | |
| 7,681,235 B2 | 3/2010 | Chesla et al. | |
| 7,765,481 B2 | 7/2010 | Dixon et al. | |
| 7,873,635 B2 | 1/2011 | Wang et al. | |
| 7,971,137 B2 | 6/2011 | Jindal et al. | |
| 8,180,891 B1 | 5/2012 | Harrison | |
| 8,220,062 B1 | 7/2012 | Arankalle et al. | |
| 2005/0050222 A1* | 3/2005 | Packer | 709/238 |
| 2006/0253584 A1 | 11/2006 | Dixon et al. | |
| 2008/0010368 A1 | 1/2008 | Hubbard et al. | |
| 2008/0133540 A1 | 6/2008 | Hubbard et al. | |
| 2008/0208868 A1 | 8/2008 | Hubbard | |
| 2008/0263659 A1* | 10/2008 | Alme | 726/22 |
| 2009/0013408 A1 | 1/2009 | Schipka | |
| 2009/0106202 A1 | 4/2009 | Mizrahi | |
| 2010/0042931 A1 | 2/2010 | Dixon et al. | |
| 2010/0094860 A1 | 4/2010 | Lin et al. | |
| 2011/0191849 A1 | 8/2011 | Jayaraman et al. | |
| 2011/0219450 A1* | 9/2011 | McDougal et al. | 726/23 |

OTHER PUBLICATIONS

Ferrer (Aug. 2008). Summary of ASF File Specification.Retrieved from http://ithreats.net/2008/08/21/summary-of-asf-file-specification.*

(Continued)

*Primary Examiner* — Ashok Patel
*Assistant Examiner* — Brian Shaw
(74) *Attorney, Agent, or Firm* — Wong Cabello Lutsch Rutherford & Brucculeri, LLP.

(57) ABSTRACT

Systems and method to detect malicious media file are described. In one example, an apparatus including a network connection, a memory, and a programmable processor communicatively coupled to the memory is discussed. The memory can include instructions, which when executed by the programmable processor cause the apparatus to receive a data stream from the network connection and detect at least a portion of a media file within the data stream. The instructions can also cause the apparatus to determine a file type of the media file and extract the media file from the data stream. Further, the instructions cause the apparatus to parse the media file to location a suspicious tag, extract an embedded URL from the suspicious tag, determine with the embedded URL is malicious, and block the media file if the embedded URL is malicious.

19 Claims, 14 Drawing Sheets

(56) References Cited

OTHER PUBLICATIONS

Fukami (Mar. 2008).SWF and the malware tragedy.Retrieved from https://www.owasp.org/images/1/10/OWASP-AppSecEU08-Fukami.pdf.*

McAfee (2008). From Zero-day to Real-time. Retrieved Apr. 8, 2013 from http://www.northgate.com.ph/imgs/news/mcafee_aretemis_technology_090508t.pdf.*

"Flash and other rich media files", Google webmaster central, (2010), 2 pgs.

Dowd, Mark, "Application-Specific Attacks: Leveraging the ActionScript Virtual Machine", IBM Global Technology Services, (Apr. 2008), 26 pgs.

* cited by examiner

SYSTEMS AND METHODS TO DETECT MALICIOUS MEDIA FILES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009, McAfee, Inc. All Rights Reserved.

TECHNICAL FIELD

Various embodiments relate generally to the field of computer security, and in particular, but not by way of limitation, to systems and methods to detect malicious media files.

BACKGROUND

Increased access to the Internet has had the unintended effect of increasing the reach of software programs that capture personal information of users without their informed consent ("Spyware") or that corrupt computers without the user's knowledge and informed consent ("Malware"). In addition, a cottage industry has arisen in software that automatically downloads and displays advertising while an application is being used ("Adware").

Such programs, when installed on the user's computer, can eavesdrop on the user, collect sensitive information and, in some cases, take control of the user's computer. In some cases, these software programs send messages out to other computers or servers, providing a conduit for the transfer of potentially sensitive information.

Another result of the increased access to the Internet is a rapid rise in the use of multimedia within sites focused on news, shopping, and entertainment, among others. The rapid rise in online media consumption has fuelled an equally rapid increase in the amount and sophistication of online attacks. Standard anti-virus software suites attempt to detect potentially malicious files through signature matching and other advanced heuristics. However, as the size of media files, such as movies, grows exponentially, the use of signature matching and heuristics becomes more and more difficult as well as very processor-intensive. The other rising challenge is in detecting what attackers may be able to embed within an otherwise innocuous media file.

BRIEF DESCRIPTION OF THE DRAWINGS

Some embodiments are illustrated by way of example and not limitation in the figures of the accompanying drawings in which:

FIGS. 8A-8D depict example Microsoft Advanced Systems Format (ASF) media file structures and an actual ASF file that contains a potentially malicious embedded URL.

FIG. 9 depicts an example Apple QuickTime Movie format (QuickTime) media file that contains a potentially malicious embedded URL.

FIG. 10 depicts an example Real Media Format (RealMedia) media file that contains a potentially malicious embedded URL.

DETAILED DESCRIPTION

Figure 1:
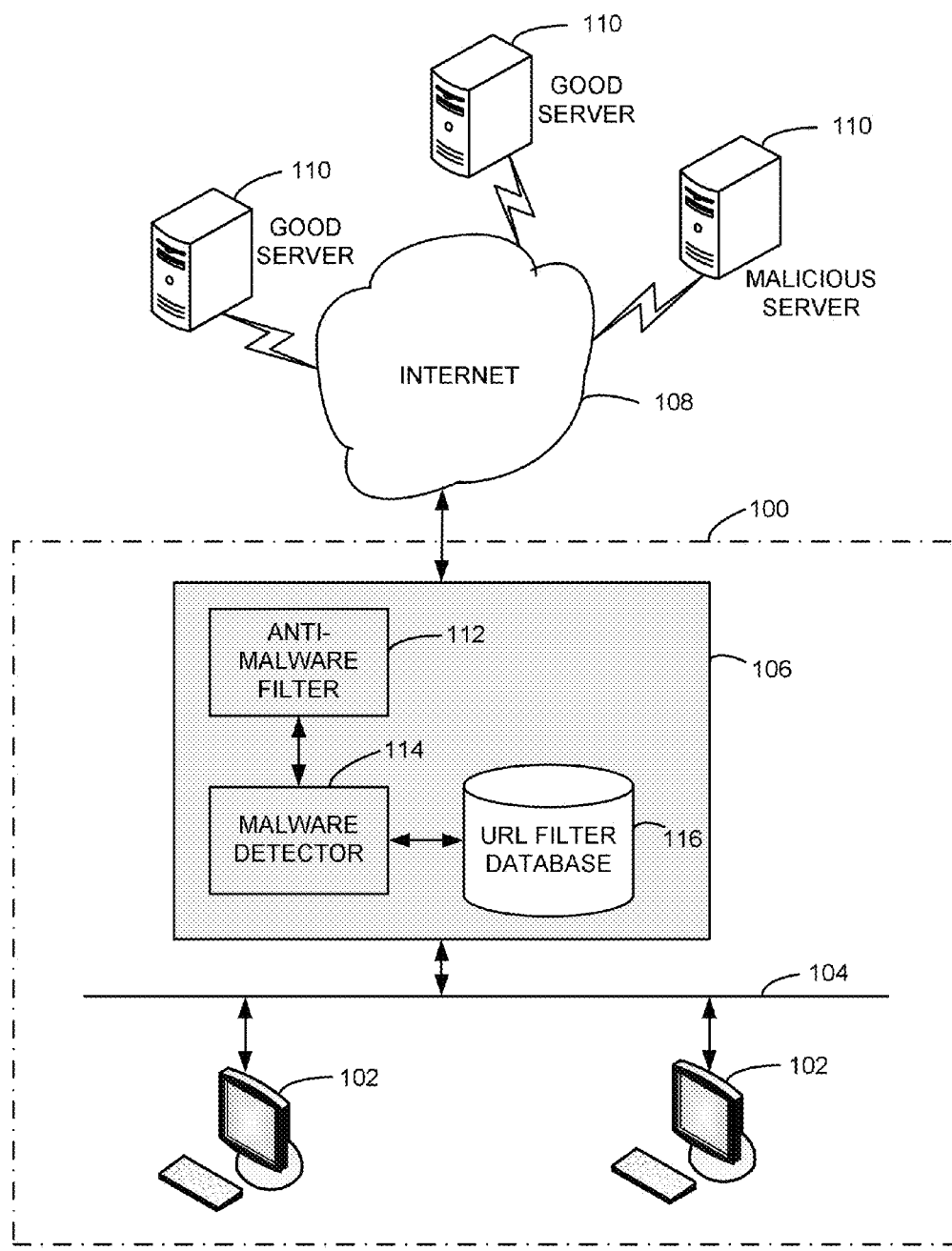
FIG. 1 is a block diagram that depicts an example system for detecting potentially malicious media files, according to various embodiments.

Disclosed herein are various embodiments (e.g., examples) of the present invention for providing methods and systems for detecting malicious media files. Detecting potentially malicious embedded commands within media file formats can protect unsuspecting end-users from encountering unwanted privacy intrusions or even damage to computing equipment from malicious downloads automatically activated by playing a media file.

Modern media file formats, such as Advanced Systems Format (from Microsoft Corporation of Redmond, Wash.) or QuickTime (from Apple Incorporated of Cupertino, Calif.), can include hyperlinks (embedded universal locator resources (URLs)) or other potentially malicious code embedded within the file. The embedded exploits can be used as a vehicle to automatically launch other web-centric attacks. Unlike executable files, applets, controls, or even document files, media file formats have traditionally been thought of as trustworthy. The traditional trustworthiness of media files can explain why typical end-user configurations allow for automatic playback of downloaded media files. However, the recent extensions to media file formats allow malware authors hooks to exploit to propagate malware.

As mentioned above, commonly used media file formats often allow for media files to be constructed to automatically launch upon receipt. The ability to auto-run allows media files to be constructed to automatically launch malicious web pages without prompting from the user, as the media file is being viewed within a media player. Attacks can include embedding links to malicious web pages, automatically launching pornographic or other distasteful web content, or even initiating the download of a virus or other malware. For example, a malicious media file can be programmed to automatically take a user to a web page that tells the user they require a special video codec (or other file) in order to view the media file. Once the user clicks on the link to download the file their computer is infected with a virus, trojan, or other malware.

The following systems and methods are presented as a mechanism to detect and block media files constructed to deliver malicious content, such as embedded URLs or other yet to be developed exploits.

DEFINITIONS

The following definitions are given by way of example and are not intended to be construed as limiting. A person of skill in the art may understand some of the terms defined below to include additional meaning when read in the context of this specification.

Executable Application—For the purposes of the following specification, an executable application can include any compiled binary application (e.g., executable application or dynamical link libraries in a Microsoft Windows® environment), browser plug-in applications, browser or application scripts (e.g., JavaScript™ or Visual Basic® script), operating system control scripts (e.g., .bat files in a Microsoft Windows® environment or C-shell scripts in a Unix environment), and run-time interpreted code or applets (e.g., Java™ applets, Visual Basic® Controls, .Net™ code). Executable applications can encompass multiple individual processing units, such as processes, threads, and fibers. Additionally, some large executable applications may utilize dynamic link libraries (DLLs), scripts, or plug-in components to extend or enhance basic functionality. Within the following specification, an executable application may be referred to variously as a process, an application, an executable, or simply as software.

Exploit—An exploit (derived from the French language, meaning "achievement", or "accomplishment") is a piece of software, a chunk of data, or sequence of commands that take advantage of a bug, glitch, or vulnerability in order to cause unintended or unanticipated behavior to occur on computer software, hardware, or other electronic device (usually computerized). Exploits frequently include such things as gaining control of a computer system or allowing a denial-of-service attack. However, an exploit within the context of this application can be as simple as automatically launching an undesired web page.

Microsoft Advanced Systems Format (ASF)—The Microsoft Advanced Systems Format (ASF) is Microsoft's proprietary digital audio/digital video container format for media files. ASF is used for both Windows Media Audio (WMA) and Windows Media Video (WMV) files. ASF is especially constructed for streaming media. ASF is based on serialized objects that are essentially byte sequences identified by a GUID (globally unique identifier) marker. The ASF format does not dictate an encoding, only a structure of the video/audio stream (similar to QuickTime and AVI formats).

Apple QuickTime Format (QuickTime)—QuickTime is an extensible proprietary multimedia framework developed by Apple Inc., capable of supporting various formats of digital video, sound, text, animation, music, and interactivity. Similar to ASF, QuickTime functions as a multimedia container file that contains one or more tracks, with each track storing a particular type of data. The QuickTime format supports wired action programming language, which allows users to create sophisticated interactive movies. Wired Action can also be exploited to embed potentially malicious actions within a QuickTime file.

Real Media Format (RealMedia)—RealMedia is another multimedia container format (created by Real Networks, Inc. of Seattle, Wash.). The RealMedia format is commonly used to stream audio and/or video over the Internet. RealMedia files are composed of sections (chunks) where logical units of data such as stream header or data packets are contained. The "DATA" section of the RealMedia file consists of a data section header followed by a series of interleaved media data packets. RealMedia files support a feature called Hypernavigation that occurs when a rendering plug-in directs the client to display a URL at a specified time in the stream. When the plug-in issues a hypernavigation request, the client's default Web browser will be directed to open the URL.

Web traffic (data)—Web traffic or web data includes all data transmitted over a network using protocols commonly used to transport information over the Internet. Examples of the protocols include, but are not limited to, internet protocol (IP), transmission control protocol (TCP), hyper text transfer protocol (HTTP), secure hyper text transfer protocol (HTTPS), file transfer protocol (FTP), simple mail transfer protocol (SMTP), post office protocol 3 (POP3), internet message access protocol (IMAP), simple object access protocol (SOAP), internet relay chat protocol (IRC), BitTorrent protocol (BitTorrent). The data transferred over one of the above protocols can include web pages containing hypertext markup language (HTML), extensible markup language (XML), programming scripts (e.g., JavaScript or VBscript), controls (e.g., ActiveX controls), or media files, among other things.

Example Systems

FIG. 1 is a block diagram that depicts an example system 100 for detecting potentially malicious media files, according to various embodiments. The system 100 represents an example approach to limiting the downloading of adware, spyware and malicious mobile code. In system 100, one or more client computers 102 are connected through a local area network 104 to a gateway 106, and through gateway 106 to Internet 108. Client computers 102 communicate with servers 110 through Internet 108.

In the example shown, one or more servers 110 contain malicious program code, such as Adware, spyware, or malware. A server that contains, or is addressed by, malicious program code will be termed a "malicious" server.

In one embodiment, system 100 limits the downloading of adware, spyware, and malicious mobile code by installing a gateway 106 at the network perimeter, and directing all web traffic (HTTP(S), FTP, SMTP, and other protocols) from the client computers 102 (including desktop computers/workstations and servers, such as E-mail servers for example) to gateway 106. That is, all client computers 102 are to be served solely by this gateway 106. In one embodiment, each gateway 106 includes a cluster of several gateway instances.

In the example depicted in FIG. 1, gateway 106 includes an anti-malware filter 112, a URL filter database 116, and a malware detector 114 connected to the anti-malware filter 112 and the URL filter database 116. The malware detector 114 performs behavioral analysis on the program file to identify URLs, categorizes the URLs as a function of the URL filter database 116, and assigns a malware probability based on the URL categories. The anti-malware filter 112 decides, based on the malware probability, how to dispose of the program file.

In one example, downloaded files, such as media files, are reviewed. In one example, a list is created of the URLs that the files will attempt to access at run-time (e.g., upon being executed or played on a client computer 102). Gateway 106 then looks up these URLs in its URL filter database 116 and classifies or blocks the download of the media file according to the categories of the URLs embedded in it. (Detection of the embedded URLs or other potentially malicious code is described below in greater detail in reference to FIGS. 5-7.)

In one example, gateway 106 scans the downloaded media files and determines the URLs that may be accessed when the media file is executed within an associated media file player, such as Windows Media Player (from Microsoft). The gateway 106 can include functionality to classify the downloaded media file according to categories assigned to the discovered URL(s) and assigns a malware probability based on the category of that URL. If two or more URLs are found, a malware probability can be calculated as a function of the malware probability of each URL. In an example, the categorization can be as simple as malicious versus non-malicious. In another example, the categorization can include finer levels of detail, and security policies can be used to determine appropriate thresholds for each organization.

In one example, no list of URLs is created. Instead, whenever a URL is found during a scan of the media file, it is checked in the URL filter database 116 and a malware probability assigned based on the category of that URL. Scanning then continues until no more URLs are found. Again, if two or more URLs are found, a malware probability is calculated as a function of the malware probability of each URL.

In an example, the gateway 106 can be programmed to scan a downloaded media file for embedded URLs. Any embedded URLs detected can be matched against known malicious or known good (white-listed) URLs within the URL filter database 116. If the gateway 106 detects a known malicious URL embedded within the media file, the gateway 106 can discard the media file. In certain examples, the gateway 106 can be configured to strip out or replace the malicious URL within the media file. If the gateway 106 can successfully remove the malicious URL, the media file can be sent on to the client 102 that requested the media file originally.

In certain examples of the system 100, the discovered URLs can be checked against an online (centralized) URL database (not shown in FIG. 1). In some examples, the online URL database can be an online reputation system, such as TrustedSource™ Internet reputation system (from McAfee®, of Santa Clara Calif.).

Figure 2:
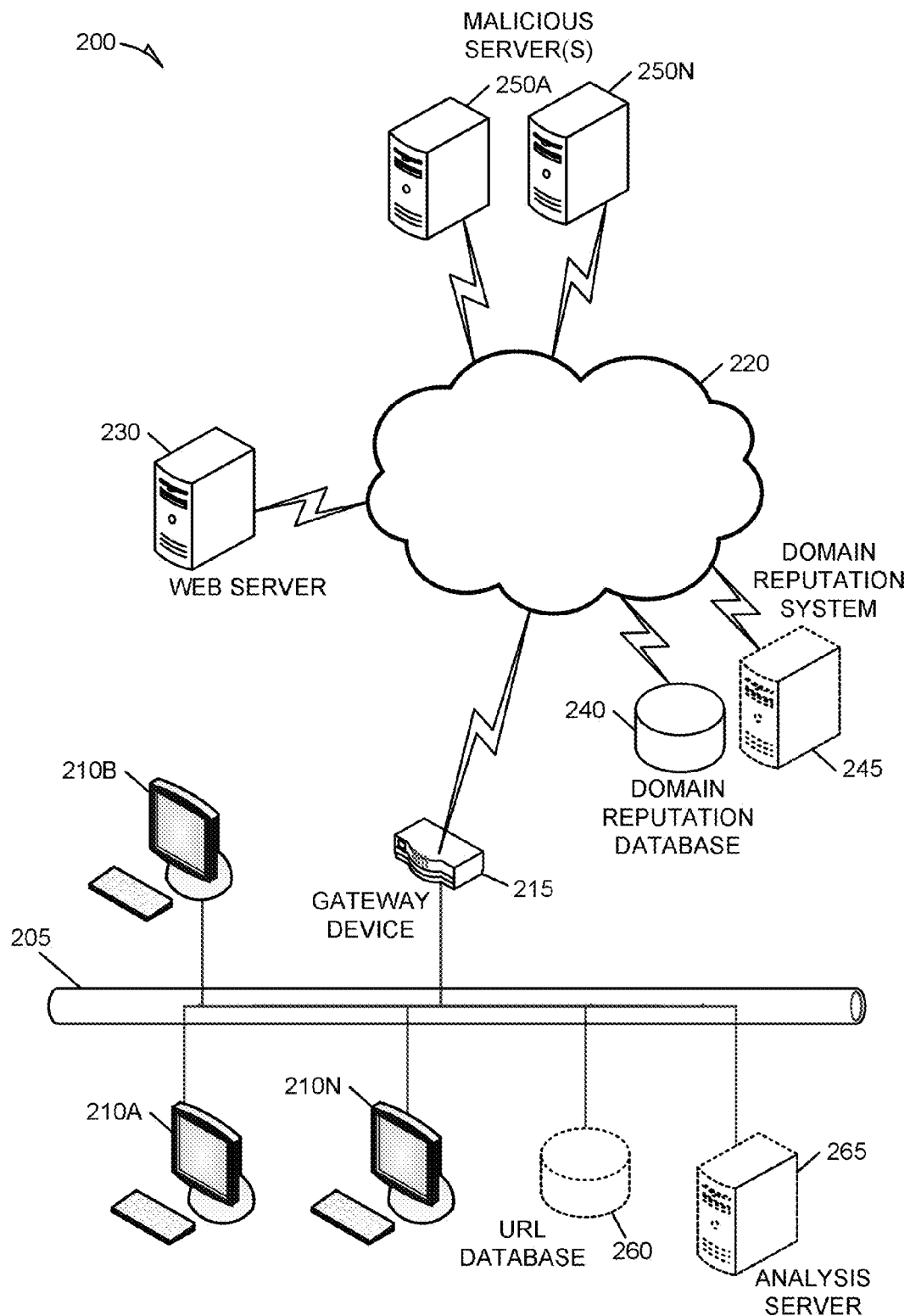
FIG. 2 is a block diagram depicting an example system for detecting potentially malicious URLs embedded within media files, according to various embodiments.

FIG. 2 is a block diagram depicting an example system 200 for detecting potentially malicious URLs embedded within media files, according to various embodiments. In this example, the system 200 includes a network 205, client systems 210A, 210B, . . . 210N (hereinafter collectively referred to as "client system 210" or "client systems 210"), gateway 215, wide-area network 220 (may also be referred to as Internet 220), web server 230, URL database 260, and malicious servers 250A . . . 250N (hereinafter collectively referred to as "malicious server 250"). In certain examples, the system 200 may also include domain reputation system 245, a local URL database 260, and a local analysis server 265. In some examples, the system 200 can also include a centralized domain reputation database 240.

In an example, the client systems 210 can be any network communication capable device, such as a personal computer, handheld device, or application server. Commonly, the client systems 210 are personal computers running a Windows®, Mac OS®, or Linux® operating system and connecting to the Internet with a web browser, such as Internet Explorer™ (from Microsoft, of Redmond, Wash.) or Firefox (from Mozilla Corporation of Mountain View, Calif.). In some examples, client systems 210 can be running web-based applications to connect to the Internet 220 and download content, which can include media files such as ASF.

In the example depicted in FIG. 2, client systems 210 connect to the Internet 220 through gateway 215. In an example, client systems 210 can request web pages from the web server 230. Web pages served by the web server 230 can contain media files; the media files can also be streamed from the web server 230 or can be streamed from a different source. In some examples, the web pages served by the web server 230 may contain media files that contain embedded URLs pointed at one of the malicious servers 250. In these examples, the web server 230 or another source of the media file may be unaware of the potentially malicious embedded URLs within the media file being delivered to the client systems 210.

Media files, such as ASF, QuickTime, or RealMedia have traditionally been considered "safe" formats. Thus, most gateways, such as gateway 215, are configured to allow standard media file content to pass unfiltered directly to client systems, such as client systems 210. Additionally, the format of media files allows malicious content to be obfuscated, such as by embedding redirection URLs within action tags, making the use of traditional gateway detection mechanisms challenging.

In an example, the system 200 includes the centralized domain reputation database 240, which can provide signature matching and/or risk rating for URLs discovered within a media file and may include risk ratings associated with the media file itself as well. The centralized domain reputation database 240 can be a commercially available reputation database, such as TrustedSource™ Internet reputation system (from McAfee®, Santa Clara Calif.). Alternatively, the centralized domain reputation database 240 can be a proprietary database with the content developed over time through collection of malicious URLs. In certain examples, the system 200 can also include a local URL database 260 that serves a similar purpose and may exchange data with the centralized domain reputation database 240.

In certain examples, the system 200 includes one or more of analysis servers 265. The analysis servers 265 can be used to analyze the potential risk of allowing any individual media file to run on one of the client systems 210. Additional discussion of the structure of the analysis servers 265 is provided below in reference to FIG. 4.

Figure 3:
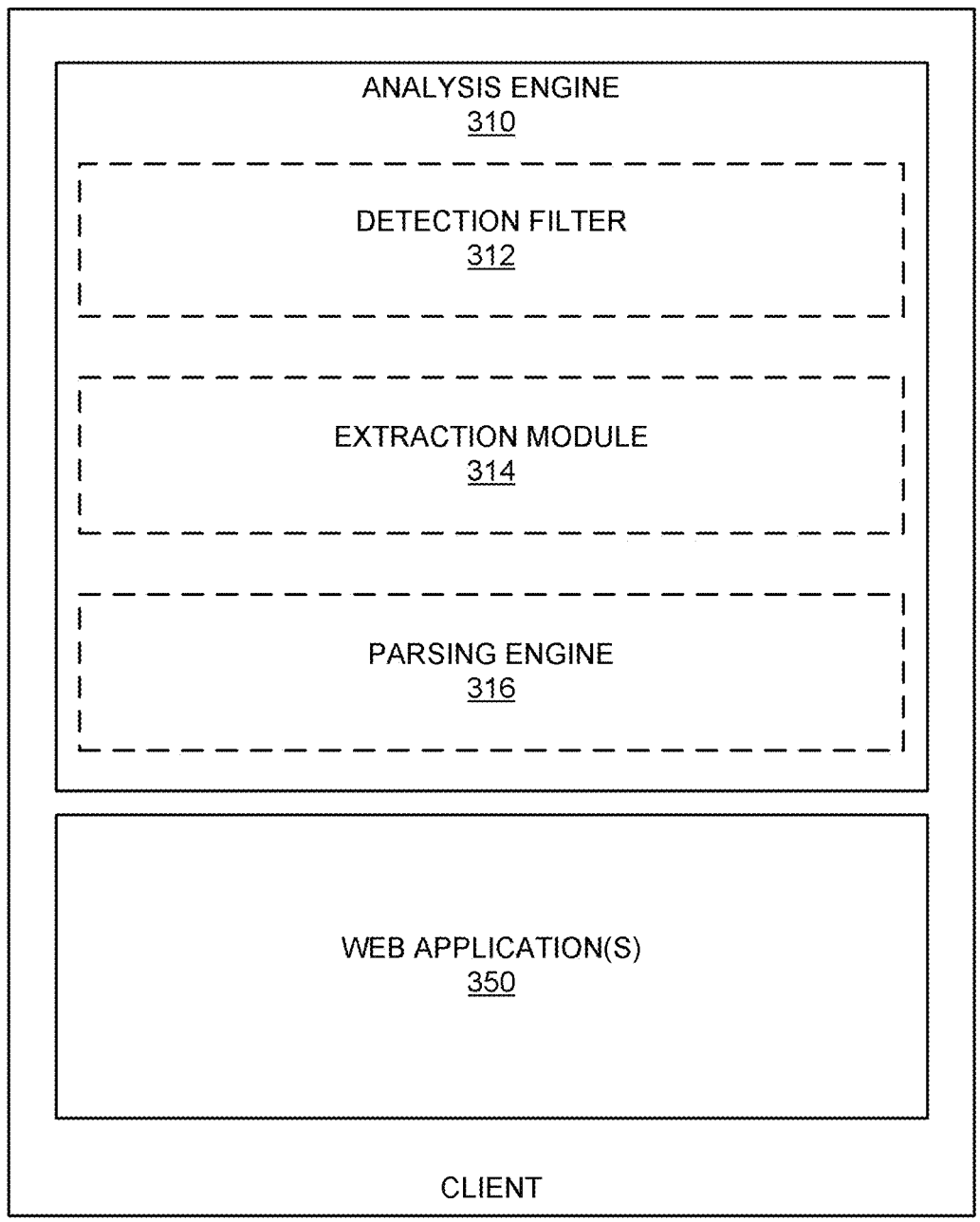
FIG. 3 is a block diagram depicting an example client-side system configured to detect and block malicious behaviour embedded within a media file, according to various embodiments.

FIG. 3 is a block diagram depicting an example client-side system 210 configured to detect and block malicious behaviour embedded within a media file, according to various embodiments. In an example, the client system 210 for detecting and blocking malicious media files includes an analysis engine 310 and one or more web applications 350. In an example, the analysis engine 310 can optionally include a detection filter 312, an extraction module 314, and a parsing engine 316. The following describes the functions that can be performed by each of the optional components of the analysis engine 310. In some examples, any or all of the discussed functionality can be performed by the analysis engine 310 without the use of any additional discrete components.

In an example, the detection filter 312 can be used to monitor web traffic (or any data stream) for incoming media files. For example, the detection filter 312 can analyze web pages for object references (or a similar construct), which embed a media file into a web page. An example HTML object reference is depicted here:

```
<object classid="clsid:22D6F312-B0F6-11D0-94AB-0080C74C7E95">
    <param name="FileName" value="http://x.com/3d.wmv" />
</object>
```

In an example, the extraction module 314 can be used to extract media files embedded within standard web pages (or otherwise delivered over the Internet 220 of FIG. 2 to the client system 210). In certain examples, the extraction module 314 detects media files (e.g., ASF, QuickTime, or RealMedia files) or embedded links out to media files within web pages or other kinds of web downloadable content. The extraction module 314 can be configured to strip the media file or the reference to the media file prior to the web page being rendered by one of the web applications 350, such as a browser. In some examples, the extraction module 314 will replace the media file or reference with a static image or HTML (hypertext mark-up language) indicating to a user that the media file content is being inspected (or blocked) for security purposes. If the media file content is found to be safe, the extraction module 314 can re-insert the media file content back into the web page and allow it to be rendered by the browser (or another one of the web applications 350).

In an example, the parsing engine 316 can be configured to search within a media file for embedded URLs or other potentially malicious code. As discussed above, many modern media file formats support various forms of scripting or action tags for creating interactivity. One option commonly provided is the ability to instruct a client system 210 to open a specified URL within a default web browser application. The ability to automatically launch URLs can be used to direct users to undesired web pages or even launch more complex exploits. The parsing engine 316 can be configured to search for signatures of embedded URLs and/or the action tags associated with potentially malicious behaviour. Detailed examples of the methods of locating embedded URLs within ASF, QuickTime, and RealMedia files are discussed below in reference to FIGS. 8-10.

In one example, the analysis engine 310 can be configured to block media files determined to be potentially malicious. The analysis engine 310 receives information from the parsing engine 316, which determines whether a given media file contains potentially malicious content (e.g., an embedded URL). In examples where the media file is determined to be potentially malicious, the analysis engine 310 can be configured to send static content, such as an image file or HTML, to warn the user of the blocked content. In certain examples, the analysis engine 310 can also send information, such as a risk rating returned from the domain reputation system 245, to one of the web applications 350, to display within the downloaded content (e.g., web page). In some examples, the analysis engine is located within the client system 210, such as analysis engine 310. In other examples, the analysis engine can be located on a remote server, such as within the domain reputation system 245 of FIG. 2.

Figure 4:
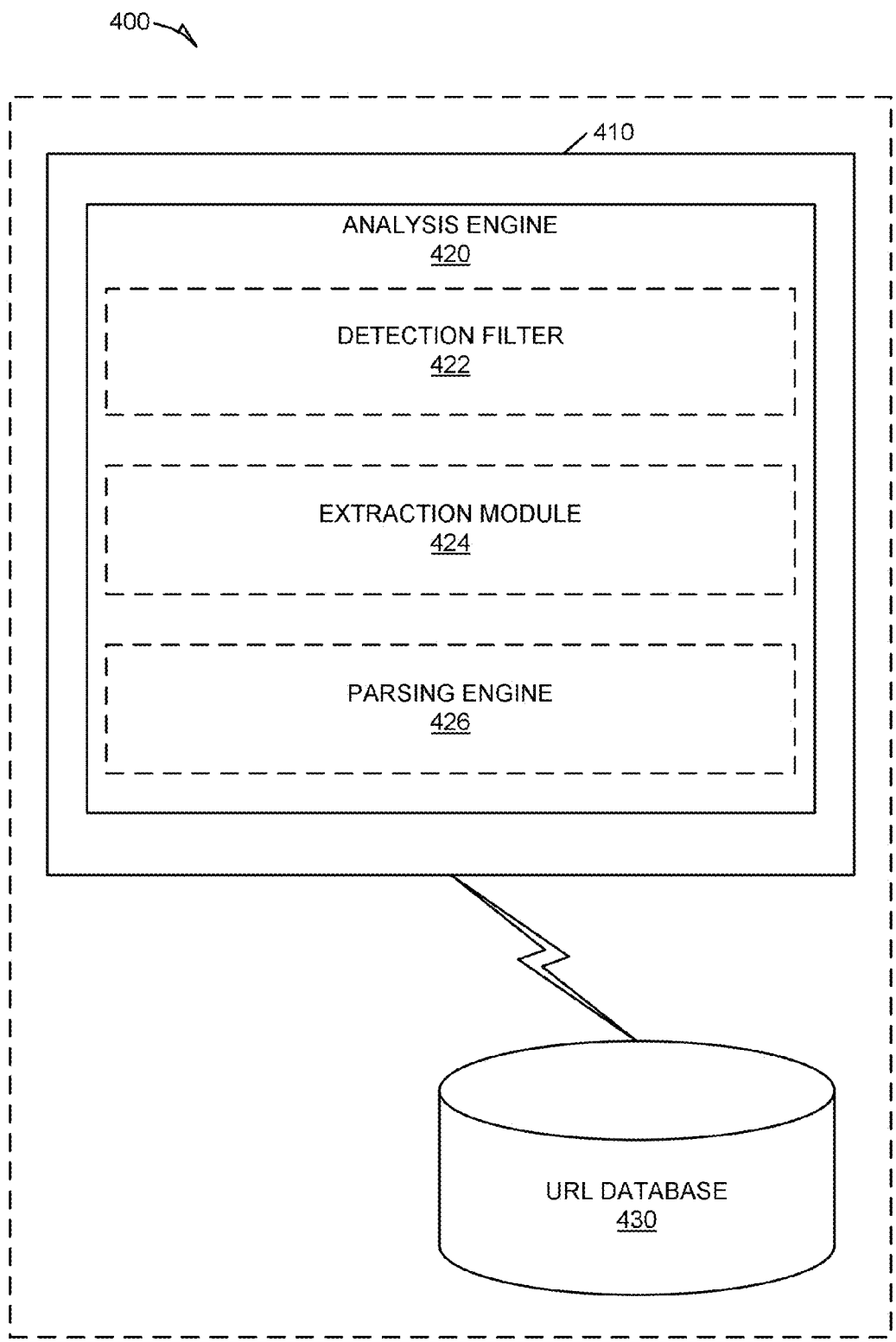
FIG. 4 is a block diagram depicting an example server-side system configured to detect and block malicious behaviour embedded within a media file, according to various embodiments.

FIG. 4 is a block diagram depicting an example server-side system 400 configured to detect and block malicious behaviour embedded within a media file, according to various embodiments. In an example, the server-side system 400 includes a server 410, an analysis engine 420, and a URL database 430. In some examples, the analysis engine 420 includes a detection filter 422, an extraction module 424, and a parsing engine 426. As noted above in reference to FIG. 3, certain example systems can locate the analysis engine 420 and/or optional components (422, 424, 436) in various locations between the client and server implementations. For example, a system can be configured where the client system 210 of FIG. 3 includes the detection filter 312 and the extraction module 314 of FIG. 3, but the server 410 includes the analysis engine 420 and the parsing engine 426. The various functions of the detection filter 312, 422, the extraction module 314, 424, analysis engine 310, 420, and the parsing engine 316, 426 are basically the same regardless of the physical implementation location. In an analysis server 265, of FIG. 2, implementation of the extraction module 424, the extraction module 424 can work in conjunction with the detection filter 312, 422 that can be running on the gateway 215 of FIG. 2 or the client systems 210 to assist in identifying incoming content containing media files.

Further discussion of the functionality associated with each structural component discussed above is provided below in reference to FIGS. 5-7. The example methods include references back to the structural components typically responsible for the execution of each operation.

Example Methods

The following examples illustrate how detection and analysis of incoming media files can be used to protect client systems from malicious exploits.

Figure 5:
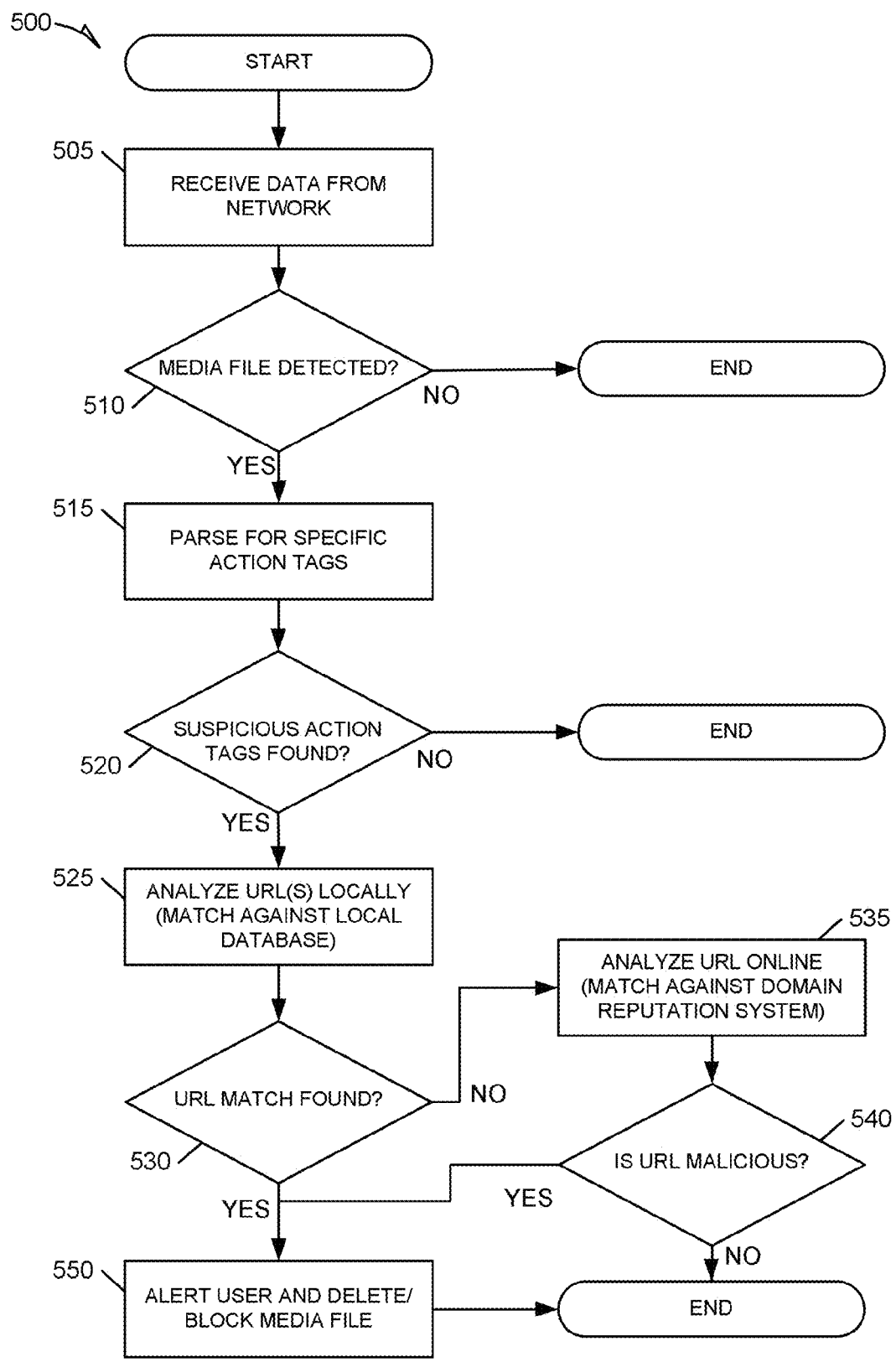
FIG. 5 is a flowchart depicting an example method for detecting and preventing potentially malicious behaviour embedded within a media file, according to various embodiments.

FIG. 5 is a flowchart depicting an example method 500 for detecting and preventing potentially malicious behaviour embedded within a media file, according to various embodiments. The method 500 includes operations for receiving data from a network (505), determining whether a media file has been detected (510), parsing the media file for specific action tags (515), determining whether a suspicious action tag has been found (520), analyzing embedded URL(s) locally (525), determining if a URL match has been found (530), analyzing embedded URL(s) online (535), determining whether an embedded URL is potentially malicious (540), and alerting a user and blocking or deleting a potentially malicious media file (550).

In this example, the method 500 begins at operation 505 with a client system 210 running a detection filter 312 on data received from a connection to network 205. At operation 510, the method 500 can continue with the client system 210 determining whether a media file is detected within the data received from the network 205. In some examples, the gateway 215 can be configured with a detection filter 312, 422 to monitor data coming in from network 220. If no media file is detected, the method 500 terminates (or in some examples, can loop back to operation 505 to receive additional data).

If a media file is detected at operation 510, the method 500 continues at operation 515 with the client system 210 using the parsing engine 316 to examine the detected media file for potentially malicious action tags (or other embedded code or scripting language). In certain examples, the client system 210 can use the analysis engine 310 to determine the type of the media file prior to parsing. Determining the media file type can be done by examining the header portion of the media file. Further discussion of parsing three common media file types, ASF, QuickTime, and RealMedia, is discussed below in reference to FIGS. 8-10.

At operation 520, the method 500 continues with the client system 210 using the analysis engine 310 to determine whether any suspicious action tags or other elements were found within the media file. For example, the ASF media file format can include a URLANDEXIT command that can cause the client system 210 to automatically launch a URL that was embedded within the media file within a default browser. If, at operation 520, no suspicious action tags or other elements are found, then the method 500 can terminate by allowing the media file to be played. The remainder of the method 500 is focused on analyzing potentially malicious URLs embedded within media file, such as described for the ASF format. In additional examples, similar steps to those discussed here could be used to analyze other potentially malicious code embedded within a media file.

If, at operation 520, any suspicious action tags or other elements were found within the media file, the method 500 continues at operation 525 with the client system 210 using the analysis engine 310 to analyze an embedded URL discovered within a media file. In an example, the analysis engine 310 can attempt to match the URL's signature against a local database, such as URL database 260. In some examples, the client system 210 can send the discovered URL to a local analysis server 265 to determine whether the URL is potentially malicious. At operation 530, the method 500 continues with the client system determining whether a match was found within the local URL database 260. In an example, the local URL database 260 can contain both known malicious and known good URLs (e.g., black and white lists). Thus, in an example not depicted by FIG. 5, the client system 210 can receive notification that the embedded URL is a known good URL (e.g., white listed URL). In this example, the method 500 can simply terminate by allowing the media file to be played by the client system 210 (or passed on to the original destination, if different than the client system 210).

If no match is found at operation 530, the method 500 continues at operation 535 with the client system 210 sending the embedded URL to an online reputation system, such as domain reputation system 245, for further analysis. In an example, the client system 210 only sends the embedded URL to the domain reputation system 245 if the local analysis failed to be conclusive (e.g., determine the URL as known malicious or known good). In some examples, if the client system 210 determines the URL to be malicious, information concerning the URL can be sent to the domain reputation system 245 in order to update centralized statistics and metrics maintained by the domain reputation system 245.

At operation 540, the method 500 continues with the domain reputation system 245 determining whether the URL is potentially malicious. If the domain reputation system 245 determines that the URL is not potentially malicious, the method 500 can conclude by allowing the media file to be played or sent to the original destination. Alternatively, if the domain reputation system 245 determines that the URL is malicious (or potentially malicious), the relevant information can be sent back to the client system 210 for further action.

At operation 550, the method 500 can conclude with the client system 210 blocking and/or deleting the media file with potentially malicious content. In an example, the client system 210 using the analysis engine can remove the malicious URL reference from the media file and allow the safe portion of the media file to be played (or delivered to the original destination).

Figure 6:
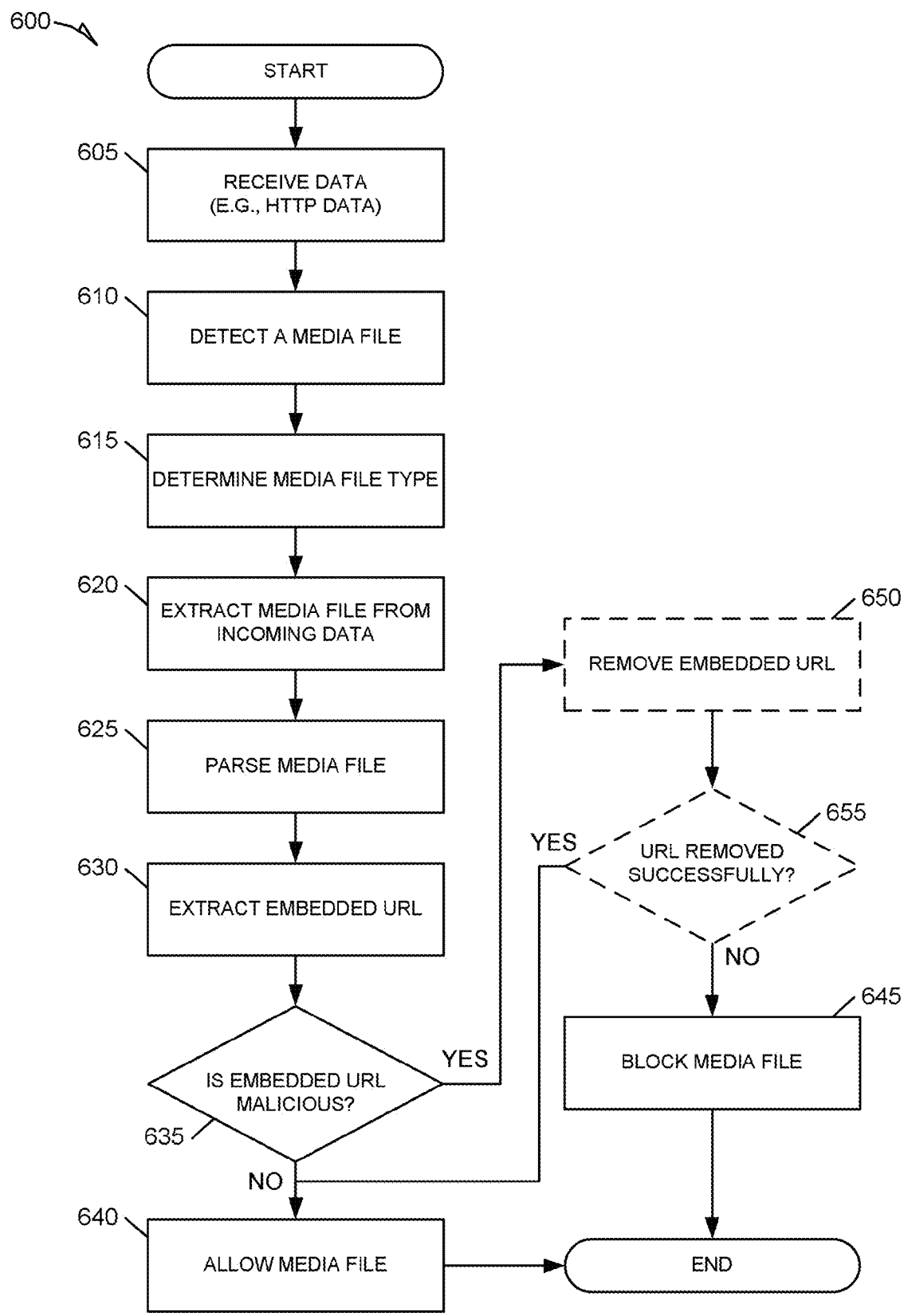
FIG. 6 is a flowchart depicting an example method for detecting and preventing potentially malicious behaviour embedded within a media file, according to various embodiments.

FIG. 6 is a flowchart depicting an example method 600 for detecting and preventing potentially malicious behaviour embedded within a media file, according to various embodiments. In an example, the method 600 includes operations for receiving data (605), detecting a media file (610), determining a file type of the media file (615), extracting the media file from the incoming (received) data (620), parsing the media file (625), extracting an embedded URL from the media file (630), determining whether the embedded URL is potentially malicious (635), allowing the media file (640), and blocking the media file (645). In certain examples, the method 600 can also optionally include an operation for removing an embedded URL from the media file (650) and determining if the URL was successfully removed (655). The method 600 can be executed across various systems discussed in reference to FIGS. 1-4. In the following example, the method 600 is discussed in reference to the client system 210 depicted in FIG. 2 and FIG. 3. In additional examples (not discussed here), the method 600 can be implemented on the gateway 215 or analysis server 265, among other locations.

At operation 605, the method 600 begins with the client system 210 receiving data (e.g., web traffic) that can include a media file. In an example, the client system 210 receives the data from a gateway 215. In another example, the client system 210 can receive the data from another client system 210 or another device connected to network 205. At operation 610, the method 600 continues with the client system 210 detecting a media file within the data received in operation 605. Once a media file is detected, the method 600 continues at operation 615 with the client system 210 determining a media file type. In an example, the client system 210 only needs to receive a portion of the media file for the analysis engine 420 to determine the file type of the media file. For example, the Audio Video Interleave (AVI) media file is based on the Resource Interchange File Format (RIFF), which means the first four (4) bytes in the file will be "RIFF." Thus, with as little as 4 bytes of the media file received, the client system 210 can start to determine potential file types.

Figure 9:
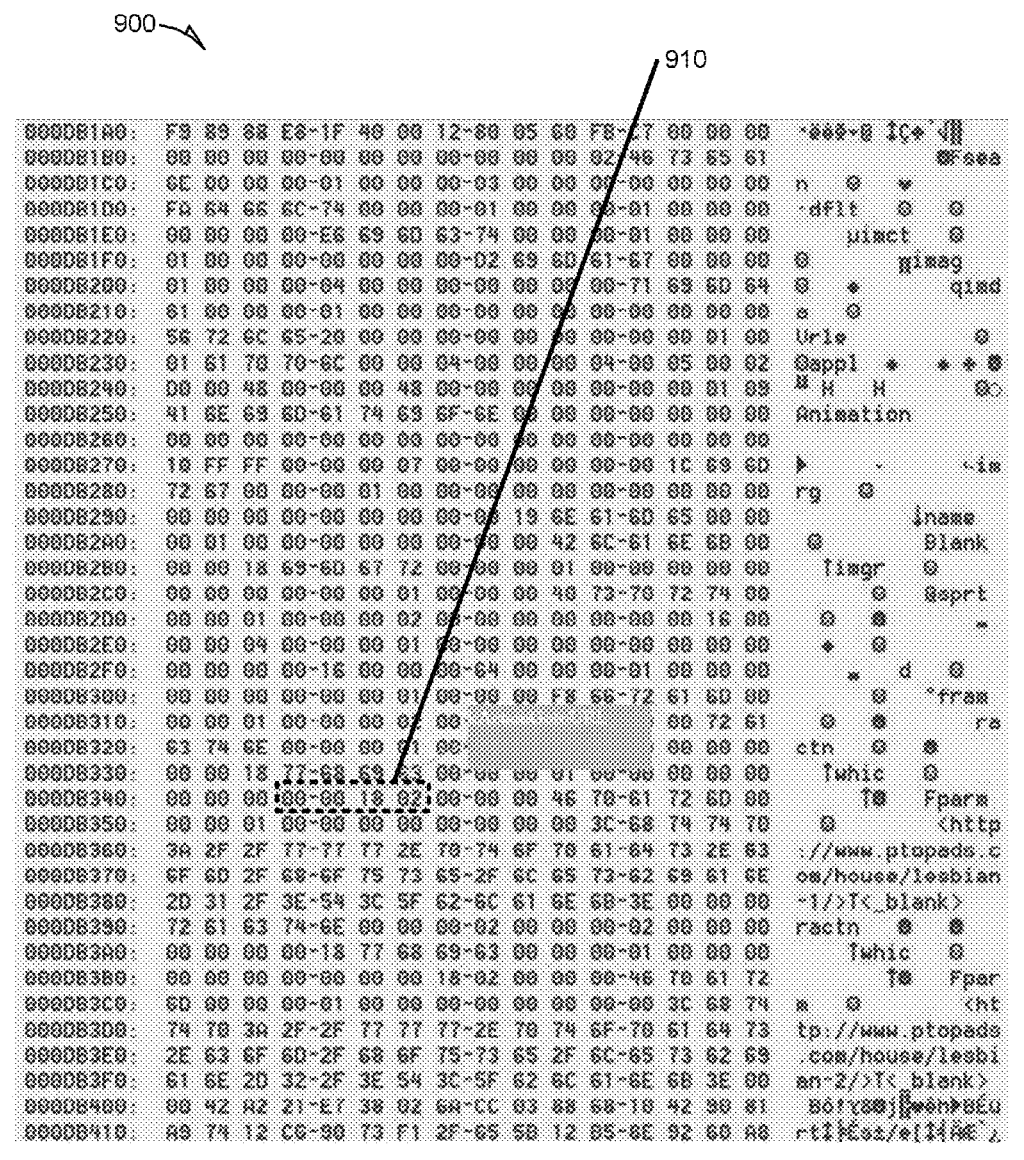

At operation 620, the method 600 continues with the client system 210 using the extraction module 314 to extract the entire media file from the received data. At operation 625, the method 600 continues with the parsing engine 316 examining the media file extracted from the incoming data stream. In an example, parsing the media file can include searching for action tags or programming codes specific to each different media file type. For example, if the analysis engine 310 determined that the media file was a QuickTime file, the parsing engine 316 can scan the contents of the file for tags such as kActionGoToURL. Searching for the kActionGoToURL tag involves scanning for DWORD "00 00 18 02" (the hexadecimal representation of kActionGoToURL), which translates into decimal 6146 (as shown in FIG. 9, 910).

At operation 630, the method 600 continues with the analysis engine 310 extracting an embedded URL. In an example, the analysis engine 310 receives results of the parsing engine 316 and extracts any potentially malicious URLs for further analysis. In an example, the parsing engine 316 outputs an embedded URL if a tag such as kActionGoToURL is located. At operation 635, the method 600 continues with the analysis engine 310 determining whether the embedded URL extracted from the media file is malicious. In an example, the analysis engine 310 can access a local URL database, such as URL database 260, to determine whether the embedded URL is malicious. In additional examples, the analysis engine 310 can also (or alternatively) access an online domain reputation system, such as domain reputation system 245, to determine whether the embedded URL is malicious. If the analysis engine determines that the embedded URL is not malicious, the method 600 can conclude at operation 640 with the client system 210 allowing the media file to be played. However, if the analysis engine 310 determines that the embedded URL is malicious (or even potentially malicious), the method 600 can conclude at operation 645 with the client system 210 blocking the media file.

In an example, if the embedded URL is determined at operation 635 to be malicious (or potentially malicious) the method 600 can continue at operation 650 with the analysis engine 310 attempting to remove the embedded URL from the media file. In an example, the analysis engine 310 can replace the potentially malicious embedded URL with NULL data or similar code that prevents the action tag from attempting to launch a default browser session. In an example, the analysis engine 310 can replace the embedded URL with a known good URL, such as a URL pointing to an internal web page that indicates that a potentially malicious URL was removed from the present media file. In an example, the analysis engine 310 can be configured to remove the potentially malicious action tag or programming code from the media file entirely. At operation 655, the method 600 continues with the analysis engine 310 determining whether the threat within the media file was successfully removed or sufficiently disabled (e.g., malicious URL replaced with a known good URL). If the analysis engine 310 was able to successfully alter the media file, then the method 600 can conclude at operation 640 by allowing the client system 210 to play the media file. However, if the analysis engine 310 determines that the media file was not successfully altered, then the method 600 concludes at operation 645 with the analysis engine 310 blocking the media file. The optional operations for attempting to alter the media file to address the potentially malicious behavior can be implemented within any of the methods discussed in FIGS. 5-7. Additionally, the components to implement operations to alter a media file can be implemented within a client system 210 (as discussed above), a gateway 215, or any computer system capable of accessing the media file (e.g., analysis server 265 or even the domain reputation system 245).

Figure 7:
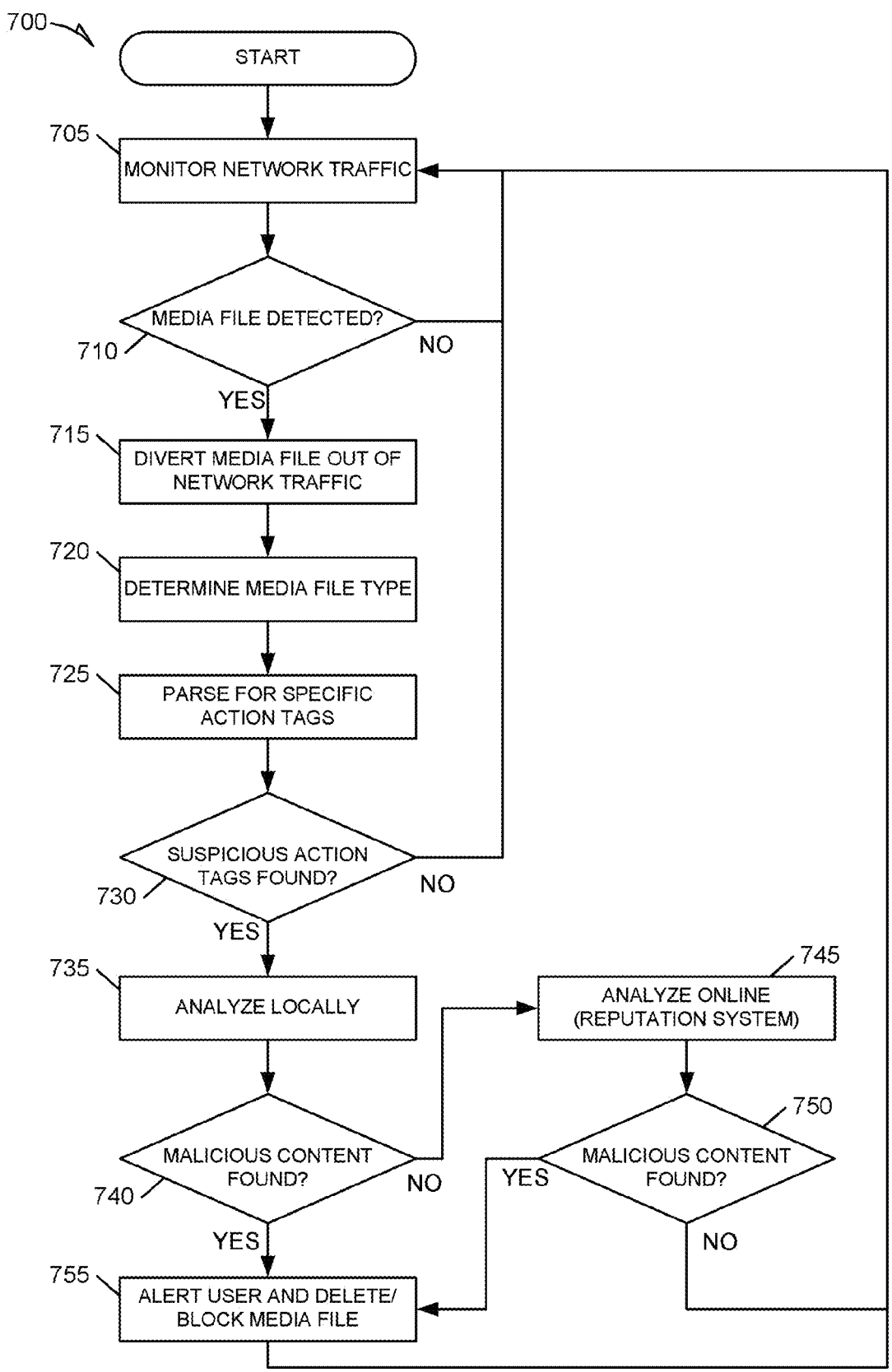
FIG. 7 is a flowchart depicting an example method for detecting and preventing potentially malicious behaviour embedded within a media file, according to various embodiments.

FIG. 7 is a flowchart depicting an example method 700 for detecting and preventing potentially malicious behaviour embedded within a media file, according to various embodiments. In an example, the method 700 includes operations for monitoring network traffic (705), detecting media files (710), diverting a detected media file out of the network traffic stream (715), determining a file type for the media file (720), parsing the media file to search for specific action tags (725), determining whether the media file contains suspicious action tags or other content (730), analyzing the media file locally (735), determining if the media file contains any malicious content (740), analyzing the media file online (745), determining if the online analysis found any malicious content (750), and alerting the user and deleting/blocking the media file (755). In the following example, the method 700 is discussed in reference to the gateway 215 depicted in FIG. 2 and FIG. 4.

At operation 705, the method 700 begins with the gateway 215 monitoring network traffic. In an example, the gateway 215 can monitor data coming from network 220. In an example, the gateway 215 can also be configured to monitor data transferred over network 205. At operation 710, the method 700 continues with the gateway 215 detecting a media file in the monitored data stream. In an example, if no media files are detected at operation 710, the method 700 loops back to the data monitoring operation (705).

At operation 715, the method 700 continues with the gateway 215 using the extraction module 424 to divert the media file out of the monitored data stream. In an example, the gateway 215 diverts the media file into memory local on the gateway 215 for further processing. In an example, the gateway 215 can divert the media file to an analysis server, such as analysis server 265, for further processing. In this example, the analysis server 265 can be configured to take over the remaining operations within the method 700. The following discussion assumes that the media file remains on the gateway 215 for further processing. However, analogous operations can be performed by the analysis server 265.

At operation 720, the method 700 continues with the gateway 215 using the analysis engine 420 to determine a file type associated with the media file. At operation 725, the method 700 continues with the parsing engine 426 using the file type information to parse the media file for specific potentially malicious action tags or other programming code. At operation 730, the method 700 continues with the gateway 215 using the analysis engine 420 to analyze the results of the parsing operation to determine whether the media file contains any suspicious content. For example, the media file can contain action tags with associated URLs (embedded URLs). In an example, the action tags can instruct a client system, such as client system 210, to automatically launch the embedded URLs. If no suspicious content is found, the method 700 can continue monitoring network traffic at operation 705.

At operation 735, the method 700 continues with the gateway 215 analyzing any suspicious content using resources located within network 205 (e.g., locally). In an example, the gateway 215 can attempt to match an embedded URL signature against the URL database 260 to see if it matches any known malicious URLs. In another example, the gateway 215 can send the media file to the analysis server 265 to analyze the contents for malicious content.

At operation 740, the method 700 continues with the gateway 215 determining whether the media file contains any malicious content (e.g., an embedded URL that points to a web site known for distributing malware). If the gateway 215 determines that the media file contains malicious content, then the method 700 can conclude at operation 755 with the gateway 215 blocking the media file and sending a notification to the intended recipient. However, if the gateway 215 was unable to determine definitively whether the media file contains malicious content, the method 700 can continue at operation 745.

At operation 745, the method 700 continues with the gateway 215 sending the suspicious action tags and/or other suspicious content (e.g., embedded URLs) to an online reputation system, such as the domain reputation system 245, for further analysis. In an example, the gateway 215 can send the entire media file to the online reputation system. In certain examples, only content such as embedded URLs are sent to the online reputation system for further analysis. At operation 750, the method 700 continues with the domain reputation system 245 determining whether the media file contains any malicious content. For example, if an embedded URL is found within the media file, the domain reputation system 245 can attempt to match the embedded URL's signature against a domain reputation database, such as domain reputation database 240. If no malicious content is found, the method 700 can continue monitoring network traffic at operation 705. If malicious content is found, the method 700 can continue at operation 755 with the gateway 215 blocking further transmission of the media file. Additionally, the gateway 215 can send an alert to the user of the potentially malicious content that was blocked.

Figure 8A:
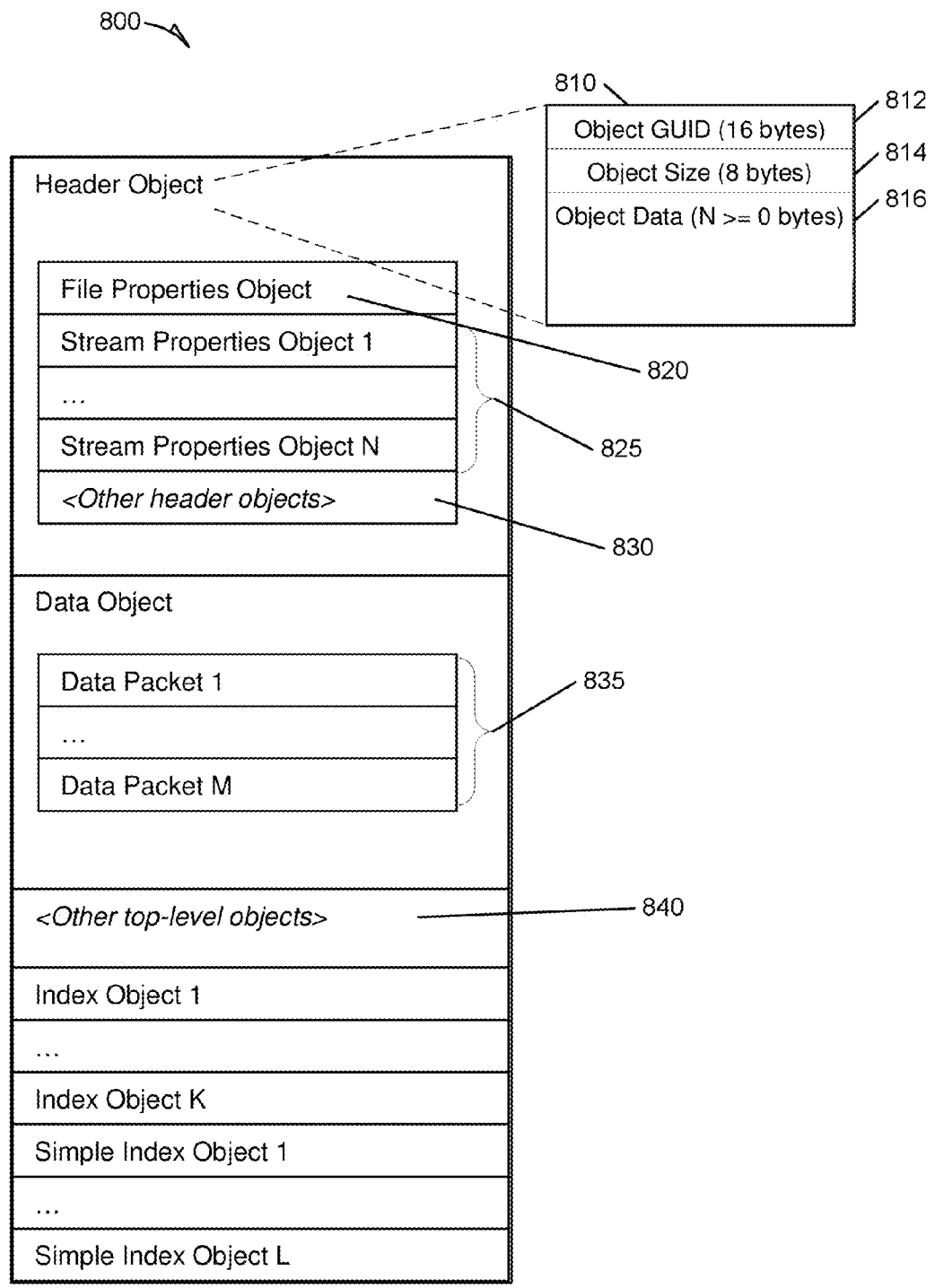
Figure 8B:
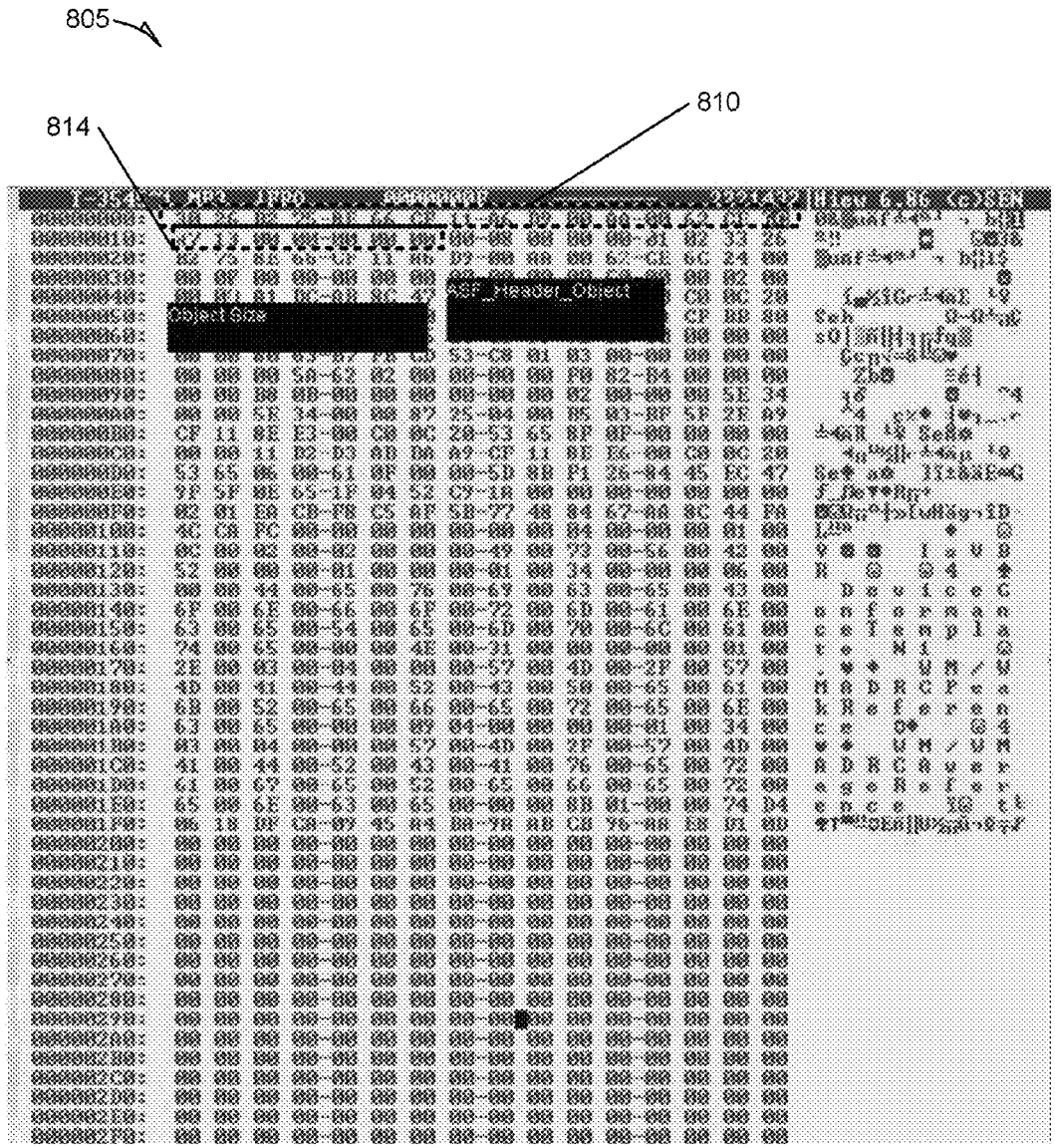

FIGS. 8A-8D depict an example Microsoft Advanced Systems Format (ASF) media file 800 structure and an actual ASF file 805 that contains a potentially malicious embedded URL. FIG. 8A is a block diagram illustrating the ASF object structure 800. The ASF object structure includes a header object 810, a file properties object 820, a plurality of stream properties objects 825, other header objects 830, multiple data objects 835, and other top-level objects 840. The header object 810 can be accessed during parsing to determine the file type by reading the first few bytes. As shown in FIG. 8A, header object consists of a 128-bit GUID 812, a 64-bit integer object size 814, and a variable-length object data 816. In this example the ASF Header object 810 is represented as 75B22630-668E-11CF-A6D9-00AA0062CE6C. The ASF media file 805 depicted in FIG. 8B highlights an example header object 810 and an example object size 814.

Knowledge of each particular media file type can increase the parsing speed as known portions of the media file can be skipped over. For example, the ASF media file contains the following different object types:

File Properties Object (820) can contain global file attributes.

Stream Properties Object (825) can define a digital media stream and its characteristics.

Header Extension Object (part of Other Header objects 830) can allow for additional functionality to be added to an ASF file while maintaining backward compatibility.

Content Description Object (part of Other Header objects 830) can contain bibliographic information about the media file.

Script Command Object (one of the Other top-level objects 840) can contain commands that can be executed on the playback timeline.

Marker Object (one of the Other top-level objects 840) can provide named jump points within a file.

For the ASF file type, the parsing operations described above can focus on Script Command Objects, as these can be used to launch malicious attacks. For example, during file parsing, the parsing engine, such as parsing engine 316, can limit search to specific Script Command Objects that are known for (or have the potential of) allowing malicious behaviour. If no Script Command Objects are found during the parsing operation, the parsing engine 316 can exit.

Figure 8C:
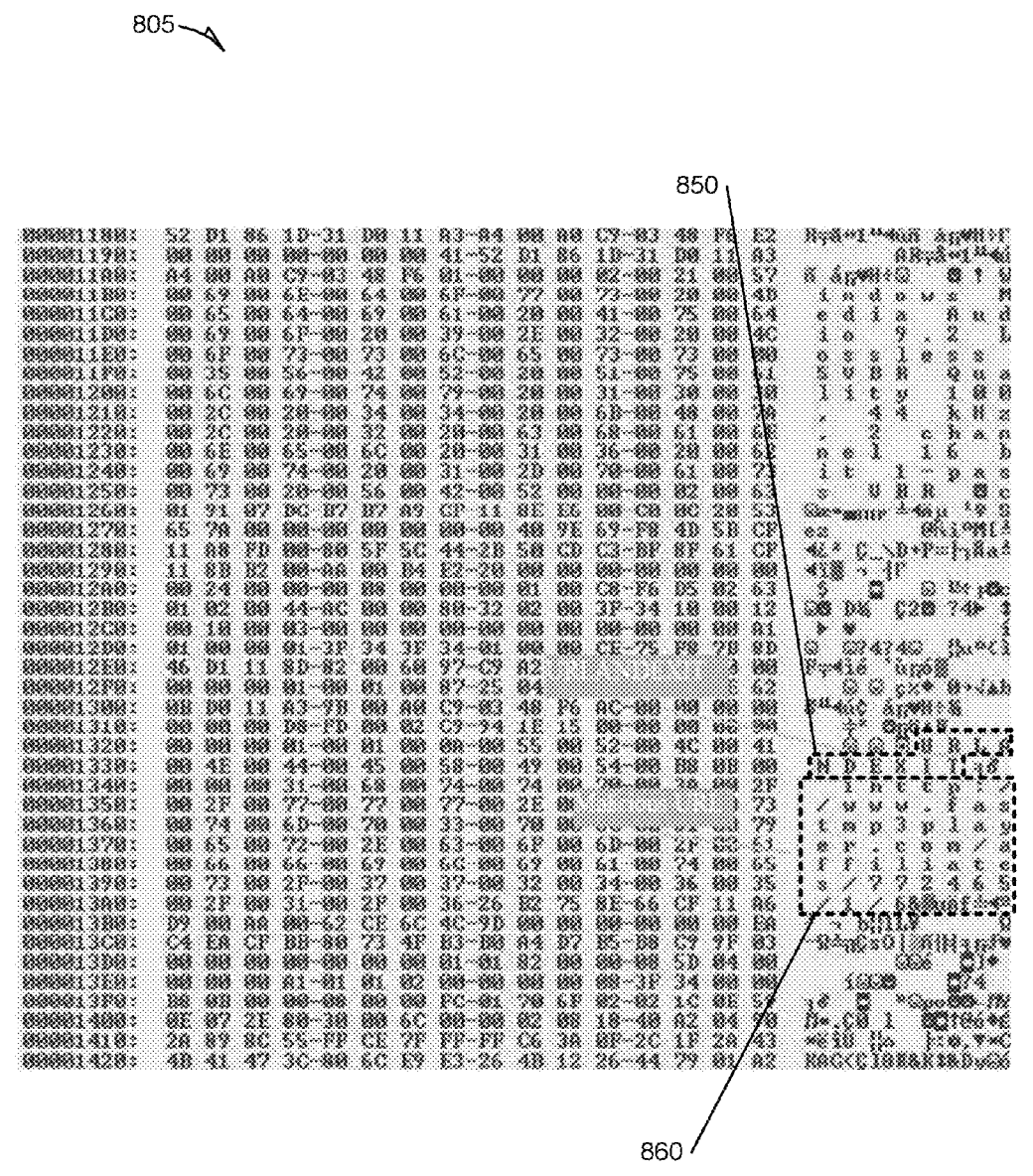

The ASF media file 805 depicted in FIG. 8C includes an example Script Command Object (URLANDEXIT 850) and an associated URL 860. The ASF file format allows creation of a script stream. The script stream can include certain simple script commands (action tags) to control the Windows™ Media Player. The URLANDEXIT action tag can be exploited by malicious authors to social engineer users into installing fake media codecs on client systems, such as client system 210. The URLANDEXIT action tag allows any sort of malicious URL to be inserted into a legitimate media file.

Figure 8D:
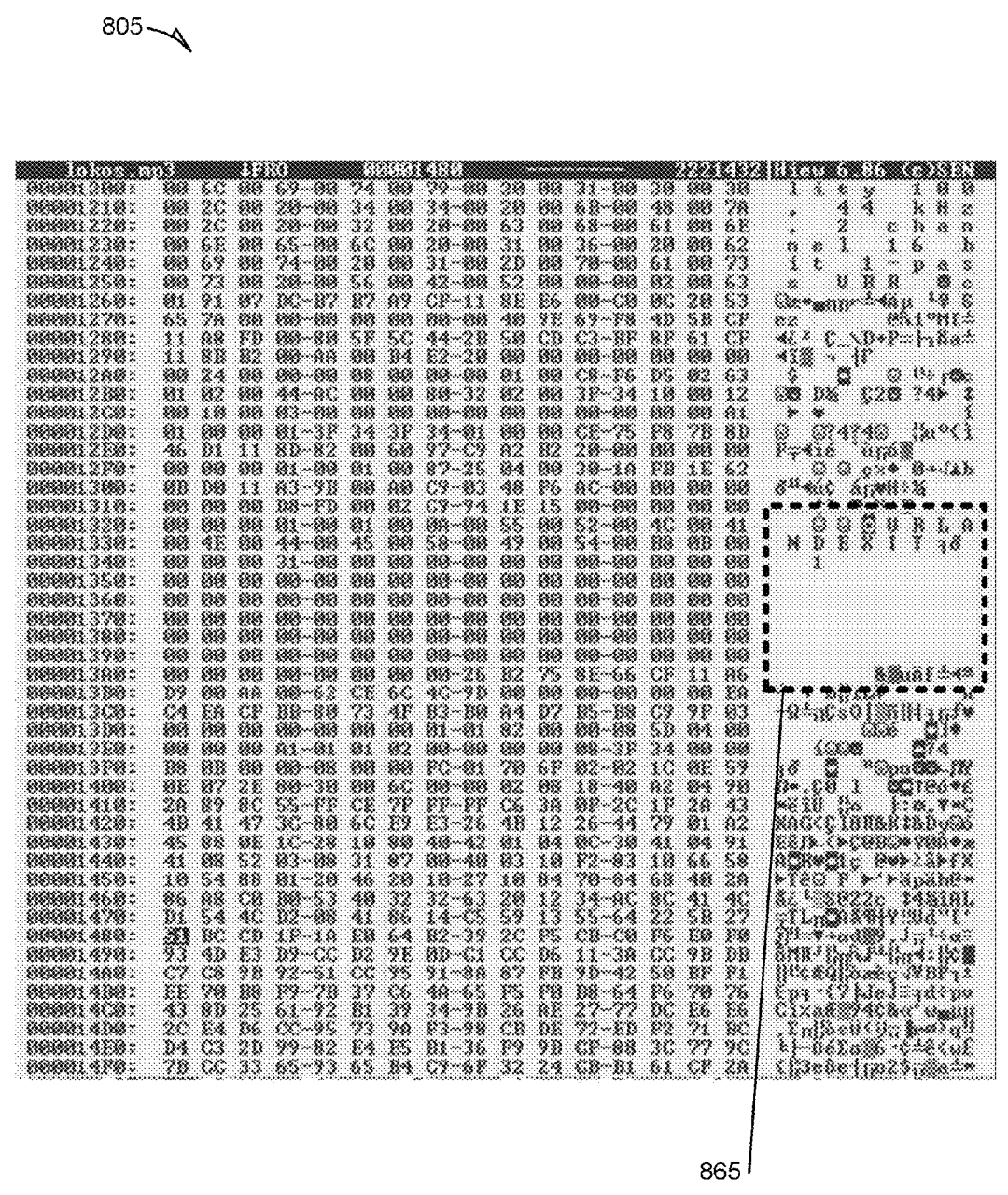

The ASF media file 805 depicted in FIG. 8D includes an example where an analysis engine, such as analysis engine 310, has removed a potentially malicious URL (compare associated URL 860 in FIG. 8C to URL location 865). In an example, the analysis engine 310 can be configured to replace an embedded URL with 0x0, which can prevent the URL from launching on a client system, such as client system 210.

FIG. 9 depicts an example Apple QuickTime Movie format (QuickTime) media file 900 that contains a potentially malicious embedded URL. The QuickTime format supports wired action programming language that allows the creation of sophisticated interactive movies. Wired action also allows a user to interact with the animation by manipulating sprites in the movie, triggering changes in the movie by clicking on a sprite, or even by opening a web site in a browser window. These operations can be implemented by embedding QT event handlers (e.g., action tags) in the media samples. As discussed above, kActionGoToURL 910 is one such QT event handlers, which opens an embedded URL within the default browser on a target system, such as client system 210. This capability can be exploited to open malicious links, prompting adware or installing malware, for example.

Figure 10:
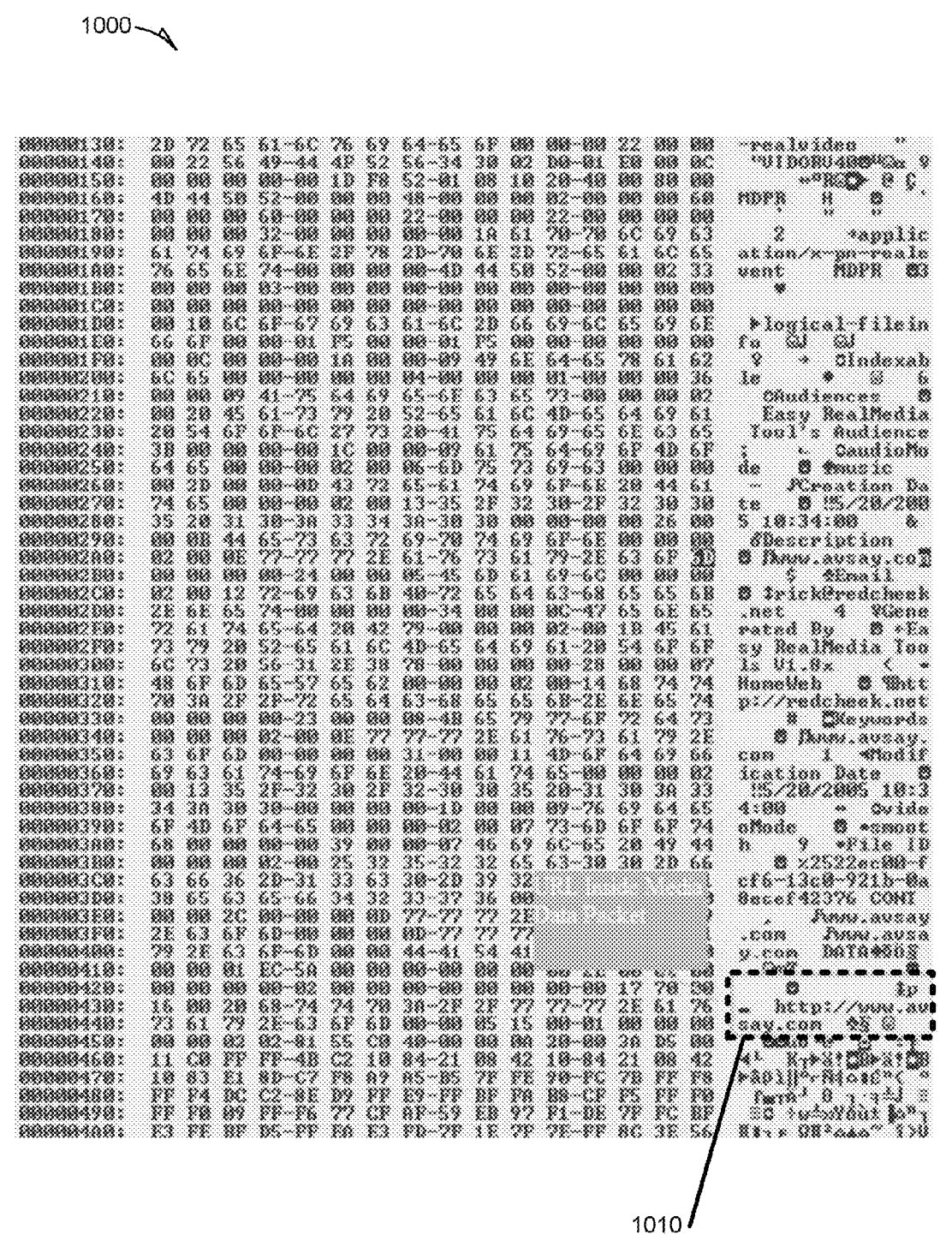

FIG. 10 depicts an example Real Media Format (RealMedia) media file 1000 that contains a potentially malicious embedded URL 1010. RealMedia files are composed of chunks of data where logical units of data, such as stream header or data packets, are contained. The "DATA" section of the RealMedia file consists of a Data section header followed by a series of interleaved media data packets. RealMedia files support a feature called Hypernavigation, which occurs when a rendering plug-in (e.g., playback application) directs the target system to display an embedded URL at a specified time in the playback stream. When the rendering plug-in issues a hypernavigation request, the default web browser opens the embedded URL. In an example, one rendering plug-in hypernavigates with "IHXHyperNavigate::GoToURL( )" The example hypernavigation function takes two parameters, a fully qualified URL and a frame target (NULL for no frame target). FIG. 10 depicts an embedded URL 1010 that will be opened within a default browser window upon running the RealMedia file 1000.

Modules, Components and Logic

Certain embodiments are described herein as including logic or a number of components, modules, engines, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of these. Example embodiments may be implemented using a computer program product (e.g., a computer program tangibly embodied in an information carrier, in a machine-readable medium for execution by, or to control the operation of, data processing apparatus, a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, for example, a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
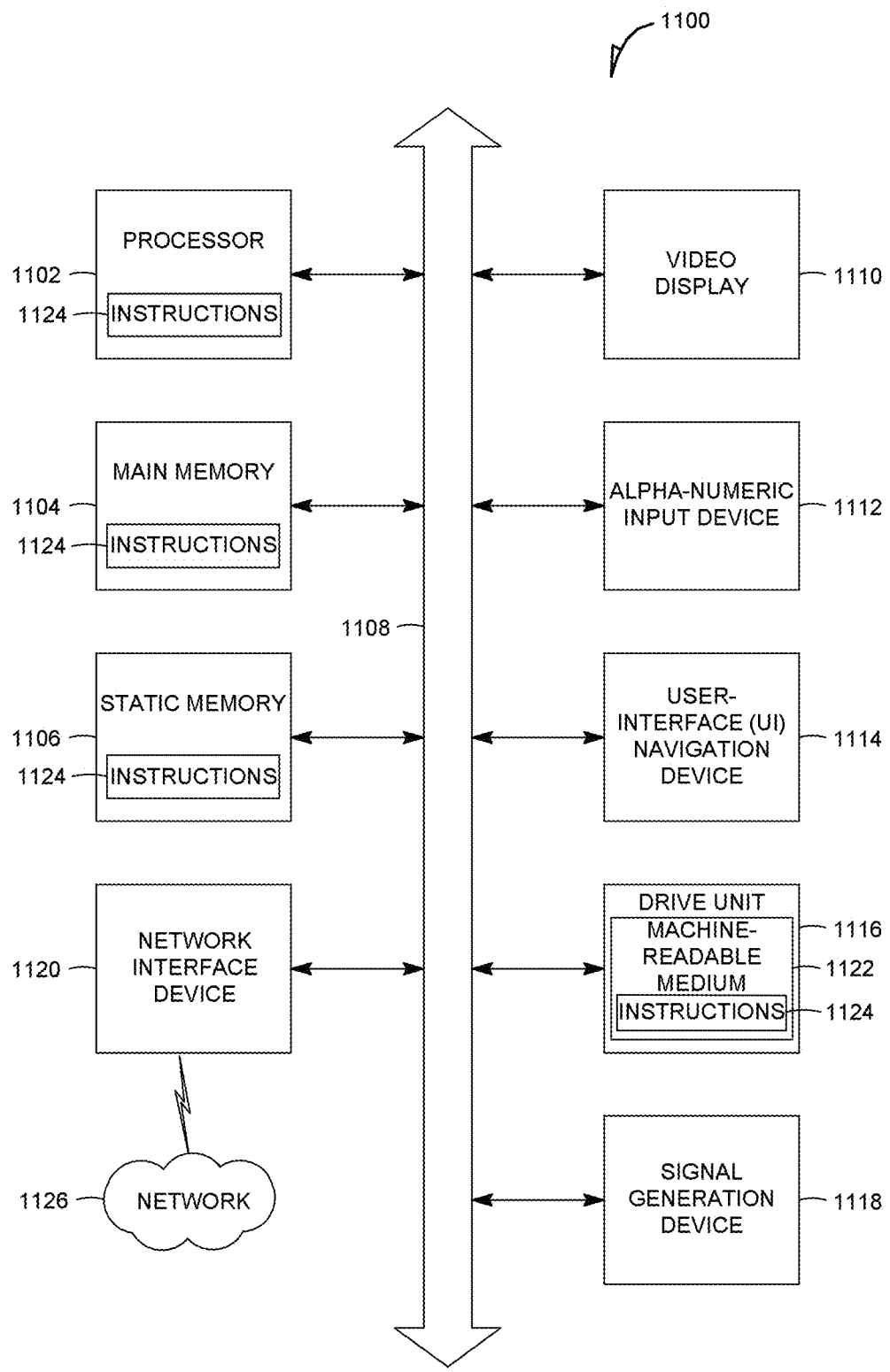
FIG. 11 is a block diagram of a machine in the example form of a computer system within which instructions for causing the machine to perform any one or more of the methodologies discussed herein may be executed.

FIG. 11 is a block diagram of a machine in the example form of a computer system 1100 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

Machine-Readable Medium

The disk drive unit 1116 includes a machine-readable medium 1122 on which is stored one or more sets of data structures and instructions (e.g., software) 1124 embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more data structures and instructions 1124. The term "machine-readable medium" shall also be taken to include any tangible medium that is capable of storing, encoding or carrying instructions for execution by the machine and that cause the machine to perform any one or more of the methodologies of the present embodiments of the invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, if used, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The claimed invention is:

1. An apparatus comprising:
    a network connection;
    a memory including instructions stored thereon; and
    a programmable processor communicatively coupled to the memory, wherein the instructions, when executed by the programmable processor, cause the programmable processor to:
        receive a data stream from the network connection;
        detect, within the data stream, at least a portion of a media file;
        determine a file type of the media file from the detected portion of the media file;
        extract the media file from the data stream received from the network connection;
        parse the media file based on the determined file type to locate a suspicious tag, wherein the suspicious tag is part of a set of tags and wherein the set of tags vary as a function of the determined file type;
        extract an embedded uniform resource locator (URL) from the suspicious tag;
        determine whether the embedded URL is malicious, comprising:
            determining whether the embedded URL matches a known malicious URL within a local database; and
            submitting the embedded URL to a domain reputation system to analyze the embedded URL against a centralized database, wherein submitting is only performed if a match is not found within the local database; and
        block the media file if the embedded URL is determined to be malicious.

2. The apparatus of claim 1, wherein the instructions cause the programmable processor to determine whether the embedded URL is malicious by comparing the embedded URL signature against a plurality of known URL signatures.

3. The apparatus of claim 2, wherein the instructions cause the programmable processor to determine whether the embedded URL is malicious by comparing the embedded URL signature against a plurality of signatures of known malicious URLs and known good URLs.

4. The apparatus of claim 1, wherein the instructions cause the programmable processor to detect a media file in the data stream by identifying a media file object tag within the data stream.

5. The apparatus of claim 1, wherein the instructions cause the programmable processor to determine a file type of the media file by determining that the media file is one of the media file types in the following group of media file types:
Advanced System Format (ASF);
QuickTime File Format; and
Real Media File Format.

6. The apparatus of claim 1, wherein the instructions cause the programmable processor to parse the media file by searching within the media file for signatures matching the suspicious tags associated with the file type.

7. A method comprising:
receiving data from an incoming network connection;
detecting, within the data, at least a portion of a media file;
determining a file type of the media file from the detected portion of the media file;
extracting the media file from the data received from the incoming network connection;
parsing the media file based on the determined file type to locate a suspicious tag, wherein the suspicious tag is part of a set of tags and wherein the set of tags vary as a function of the determined file type;
extracting an embedded uniform resource locator (URL) from the suspicious tag;
determining whether the embedded URL is malicious, comprising:
determining whether the embedded URL matches a known malicious URL within a local database; and
submitting the embedded URL to a domain reputation system to analyze the embedded URL against a centralized database wherein submitting is only performed if a match is not found within the local database; and
blocking the media file if the embedded URL is malicious.

8. The method of claim 7, wherein determining whether the embedded URL is malicious includes comparing an embedded URL signature against a plurality of known URL signatures.

9. The method of claim 8, wherein the plurality of known URL signatures includes signatures of known malicious URLs and known good URLs.

10. The method of claim 7, wherein the detecting a media file includes identifying a media file related object tag within a web page.

11. The method of claim 7, wherein the determining a file type of the media file includes determining that the media file is one of the media file types in the following group of media file types:
Advanced System Format (ASF);
QuickTime File Format; and
Real Media File Format.

12. The method of claim 7, wherein the parsing the media the includes searching within the media file for signatures matching the suspicious tags associated with the file type.

13. A system comprising:
a network;
a database including data related to potentially malicious URLs; and
a computer communicatively coupled to the database, the computer including:
a network interface connecting the computer to the network;
a memory containing instructions; and
one or more processors communicatively coupled to the memory, wherein the instructions, when executed by the one or more processors, cause the computer to:
monitor data transferred over the network through the network interface;
detect, within the data transferred over the network, at least a portion of a media file;
determine a file type of the media file from the detected portion of the media file;
parse the media the based on the determined file type to locate suspicious tags, wherein the suspicious tags are part of a set of tags and wherein the set of tags vary as a function of the determined file type;
extract an embedded uniform resource locator (URL) from a suspicious tag;
determine whether the embedded URL is malicious, comprising:
determining whether the embedded URL matches data related to potentially malicious URLs within the database; and
submitting the embedded URL to a domain reputation system to analyze the embedded URL against a centralized database wherein submitting is only performed if a match is not found within the database; and
discard the media the if the embedded URL is malicious.

14. The system of claim 13, wherein the instructions cause the computer further to transmit the media the on to an original destination of the media the if the embedded URL is not determined to be malicious.

15. The system of claim 13, wherein the database is connected to the network.

16. The system of claim 13, wherein the database includes a plurality of URL signatures including signatures of known good URLs and known malicious URLs.

17. The system of claim 13 further comprising:
a second network connected to the local network through a gateway device; and
the domain reputation system connected to the second network.

18. The system of claim 17, wherein the computer further includes a second network interface connected to a second network; and
wherein the memory further includes instructions that cause the computer to function as the gateway device.

19. The system of claim 13, wherein the instructions cause the computer further to determine a malware probability for the media file based upon a probability calculated as a function of the malware probability of two or more URLs extracted from the media file.

* * * * *

UNITED STATES PATENT AND TRADEMARK OFFICE
CERTIFICATE OF CORRECTION

PATENT NO. : 8,510,829 B2
APPLICATION NO. : 12/822856
DATED : August 13, 2013
INVENTOR(S) : Rahul Mohandas et al.

It is certified that error appears in the above-identified patent and that said Letters Patent is hereby corrected as shown below:

On the title page

In item (75), in column 1, in "Inventors", line 2-3, delete "Plasamudram Ramagopal Prashanth" and insert -- Palasamudram Ramagopal Prashanth --, therefor.

In item (57), in column 2, in "Abstract", line 12, delete "location" and insert -- locate --, therefor.

In the claims

In column 19, line 44, in claim 7, delete "database" and insert -- database, --, therefor.

In column 20, line 2, in claim 12, delete "the" and insert -- file --, therefor. (1st occurrence)

In column 20, line 22, in claim 13, delete "the" and insert -- file --, therefor. (2nd occurrence)

In column 20, line 35, in claim 13, delete "database" and insert -- database, --, therefor.

In column 20, line 38, in claim 13, delete "the" and insert -- file --, therefor. (2nd occurrence)

In column 20, line 41, in claim 14, delete "the" and insert -- file --, therefor. (2nd occurrence)

In column 20, line 42, in claim 14, delete "the" and insert -- file --, therefor. (2nd occurrence)

In column 20, line 50, in claim 17, delete "the local" and insert -- the --, therefor.

Signed and Sealed this
Tenth Day of December, 2013

Margaret A. Focarino
*Commissioner for Patents of the United States Patent and Trademark Office*